(No Model.)

H. TRASK & W. N. CARMICHAEL.
VALVED PIPE COUPLING.

No. 408,273. Patented Aug. 6, 1889.

Witnesses
Manuel Rodriguez
C. C. Weightman

Inventor.
Harry Trask
Wm N Carmichael by
Wm H Weightman
Atty

UNITED STATES PATENT OFFICE.

HARRY TRASK, OF BROOKLYN, AND WILLIAM N. CARMICHAEL, OF NEW YORK, N. Y.

VALVED PIPE-COUPLING.

SPECIFICATION forming part of Letters Patent No. 408,273, dated August 6, 1889.

Original application filed June 11, 1888, Serial No. 276,669. Divided and this application filed November 21, 1888. Serial No. 291,438. (No model.)

*To all whom it may concern:*

Be it known that we, HARRY TRASK, of Brooklyn, Kings county, and State of New York, and WILLIAM N. CARMICHAEL, of the city, county, and State of New York, have invented certain new and useful Improvements in Valved Pipe-Couplings, of which the following is a specification, reference being had to the accompanying drawings, the said invention being a part or division of our original application filed June 11, 1888, and numbered Serial No. 276,669.

The object of these improvements is the construction of an economical and easily-connected valved pipe-coupling, and one that will be reliable in its operation under all conditions and circumstances; and our improvements consist in the construction, combination, and adaptation of the several parts or portions of which the coupling is composed, as may hereinafter be described and specified.

Figure 1:
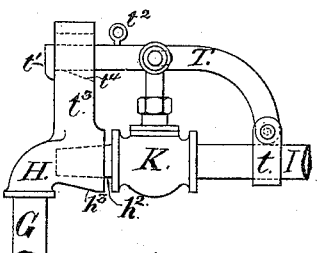
Figure 2:
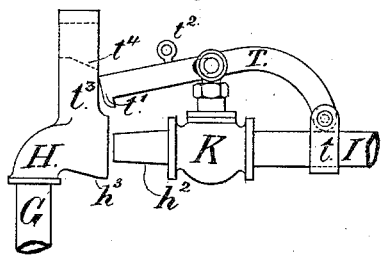

In the drawings, Figure 1 represents the valved pipe-coupling connected, and Fig. 2 represents the same disconnected.

Similar letters of reference designate like parts or portions in both the figures.

The letter H designates the female portion of the coupling, and K designates the valve with male portion of slip-joint attached thereto.

G and I designate the pipes to be connected. Pipe G may of course lie in a horizontal direction, if necessary.

T designates a lever, to which is attached the stem of the check-valve K. This lever T is hinged at pipe-strap $t$ to pipe I, and is fitted with a hook $t'$ and lifting eye or handle $t^2$. To accommodate the radial movement of the lever T, the pin-hole for connecting the valve-stem of K to lever T is slightly elongated. The portion H is fitted with a slotted lug or boss $t^3$, which is preferably provided with a wedge-incline $t^4$, to effect the gradual lifting of the valve-stem as the coupling is effected. Such incline is not altogether essential, since the lever may be raised by hand to pass into the slot and open the valve. The male and female portions of the coupling are designated by $h^2$ and $h^3$. In making up the connection of this slip-joint the two portions are brought together, presenting the portions $h^2$ and $h^3$ opposite each other, as also the lever T opposite the slot of lug $t^3$. The portion $h^2$ is entered into portion $h^3$ and lever T into slotted lug $t^3$, and the hooked portion $t'$ exits through the slot and drops to hook the two together and hold the valve K open.

To disconnect the two portions of the coupling and close the valve K, it is only necessary to unhook the lever T at $t'$ and draw them apart, the lever T at once passing out of the slotted lug $t^3$ and the portion $h^2$ out of $h^3$.

What we claim as new, and desire to secure by Letters Patent, is—

1. In a valved pipe-coupling, in combination with the two portions of the piping to be coupled, a pipe-strap $t$, secured to one of said portions, a valve K, secured to the same portion, a hooked lever hinged to said pipe-strap and connected to the stem of said valve K, a coupling-piece secured to the second of said pipe portions to be coupled and having a projecting lug provided with a slot, into which the said hooked lever enters to complete the connection, and the male and female portions $h^2$ and $h^3$, forming the joint of the connection, substantially as and for the purposes set forth.

2. In a valved pipe-coupling, in combination with the two portions of piping to be coupled, a pipe-strap $t$, secured to one of said portions, a valve K, secured to the same portion, a hooked lever hinged to said pipe-strap and connected to the stem of said valve K, a coupling-piece secured to the second of said pipe portions to be coupled and having a projecting lug provided with an inclined slot, into which the said hooked lever enters and up the incline of which it moves to open the valve and complete the connection, and the male and female portions $h^2$ and $h^3$, forming the joint of the connection, substantially as and for the purposes set forth.

HARRY TRASK.
WILLIAM N. CARMICHAEL.

Witnesses:
WM. H. WEIGHTMAN,
MANUEL RODRIGUEZ.